(12) United States Patent
Gronemann et al.

(10) Patent No.: US 10,259,708 B2
(45) Date of Patent: Apr. 16, 2019

(54) METHOD FOR STARTING UP A PRE-REFORMING STAGE

(71) Applicant: L'Air Liquide, Societe Anonyme pour l'Etude et l'Exploitation des Procedes Georges Claude, Paris (FR)

(72) Inventors: Veronika Gronemann, Karben (DE); Jorg Ott, Frankfurt (DE); Theis Ohlhaver, Frankfurt am Main (DE); Paul Krimlowski, Frankfurt am Main (DE)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 211 days.

(21) Appl. No.: 14/890,702

(22) PCT Filed: May 5, 2014

(86) PCT No.: PCT/EP2014/059050
§ 371 (c)(1),
(2) Date: Nov. 12, 2015

(87) PCT Pub. No.: WO2014/184022
PCT Pub. Date: Nov. 20, 2014

(65) Prior Publication Data
US 2016/0115021 A1 Apr. 28, 2016

(30) Foreign Application Priority Data
May 13, 2013 (DE) .................. 10 2013 104 893

(51) Int. Cl.
*C01B 3/38* (2006.01)
*B01J 19/24* (2006.01)

(52) U.S. Cl.
CPC ............. *C01B 3/382* (2013.01); *B01J 19/245* (2013.01); *B01J 2219/24* (2013.01);
(Continued)

(58) Field of Classification Search
CPC ............................ C01B 3/382; B01J 19/245
See application file for complete search history.

(56) References Cited

U.S. PATENT DOCUMENTS 3,444,099 A 5/1969 Taylor et al.
5,595,833 A 1/1997 Gardner et al.
(Continued)

FOREIGN PATENT DOCUMENTS

DE 1 545 440 1/1970
EP 0 921 585 6/1999
(Continued)

OTHER PUBLICATIONS

International Search Report for PCT/EP2014/059050, dated Jul. 23, 2014.

*Primary Examiner* — Paul A Wartalowicz
(74) *Attorney, Agent, or Firm* — Justin K. Murray

(57) ABSTRACT

There is proposed a method for starting up a pre-reforming stage in an integrated reforming plant in which a hydrocarbonaceous feed stream, in particular natural gas, is converted into a reformation product containing carbon oxides, hydrogen and hydrocarbons. Before carrying out the start-up method, the catalyst contained in the pre-reforming stage is in an oxidized or passivated state. For its activation, the pre-reforming catalyst is charged with a methanol/steam mixture, from which by steam reformation of methanol in situ the hydrogen required for the activation of the catalyst is produced. Excess hydrogen is used for the hydrogen supply of the desulfurization stage arranged upstream of the pre-reforming stage.

18 Claims, 1 Drawing Sheet

(52) U.S. Cl.
CPC ............ *C01B 2203/0233* (2013.01); *C01B 2203/0244* (2013.01); *C01B 2203/0405* (2013.01); *C01B 2203/1058* (2013.01); *C01B 2203/127* (2013.01); *C01B 2203/1223* (2013.01); *C01B 2203/1241* (2013.01); *C01B 2203/142* (2013.01); *C01B 2203/1604* (2013.01)

(56) References Cited

U.S. PATENT DOCUMENTS

| | | | | |
|---|---|---|---|---|
| 2002/0006968 | A1* | 1/2002 | Abbott | B01J 8/0496 518/704 |
| 2002/0136677 | A1* | 9/2002 | Sederquist | B01B 1/005 48/127.9 |
| 2005/0223644 | A1* | 10/2005 | Kim | C01B 3/32 48/198.5 |
| 2006/0292069 | A1* | 12/2006 | Pez | C01B 3/38 423/651 |
| 2013/0281289 | A1* | 10/2013 | Forrest | B01J 21/005 502/328 |

FOREIGN PATENT DOCUMENTS

| | | |
|---|---|---|
| EP | 0 936 182 | 8/1999 |
| GB | 1 465 269 | 2/1977 |
| WO | WO 2013 061040 | 5/2013 |

* cited by examiner

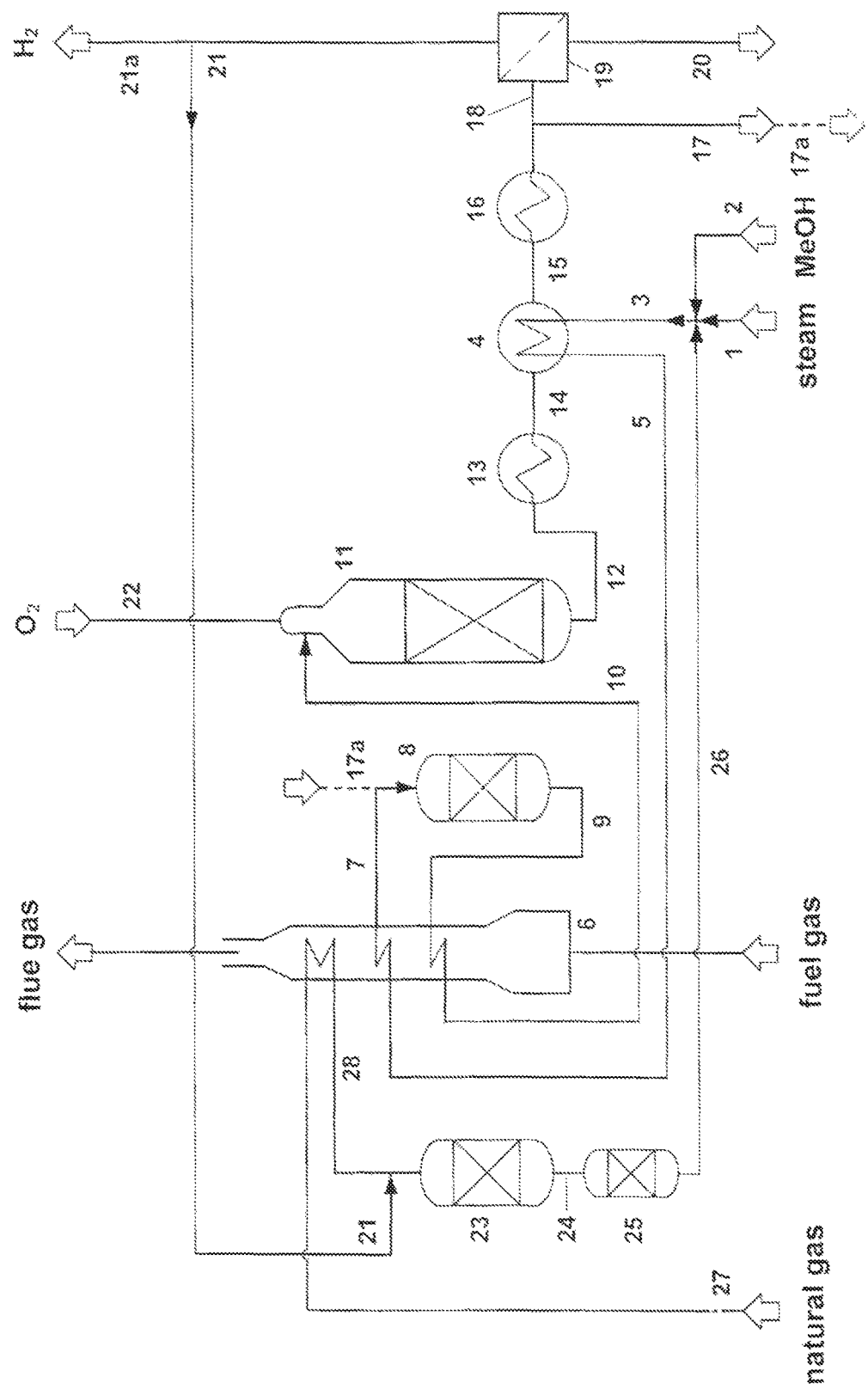

METHOD FOR STARTING UP A PRE-REFORMING STAGE

CROSS REFERENCE TO RELATED APPLICATIONS

This application is a § 371 of International PCT Application PCT/EP2014/059050, filed May 5, 2014, which claims the benefit of DE 10 2013 104 893.5, filed May 13, 2013, both of which are herein incorporated by reference in their entireties.

FIELD OF THE INVENTION

This invention relates to a method for starting up a pre-reformpre-reforming stage, in particular a pre-reforming stage in an integrated reforming plant in which a hydrocarbonaceous feed stream, in particular natural gas, is converted into a reformation product containing carbon oxides, hydrogen and hydrocarbons. Before carrying out the start-up method, the catalyst contained in the pre-reforming stage is in an oxidized or passivated state. As compared to the start-up methods for pre-reforming stages known from the prior art, operating materials easier to handle are used in the method according to the invention. Furthermore, smaller apparatuses are used, whereby the investment costs are reduced.

In a further aspect, the invention furthermore relates to an integrated reformer plant, comprising each at least one pre-reforming reactor, a main reforming reactor downstream of the pre-reforming reactor, a desulfurization reactor upstream of the pre-reforming reactor, and a hydrogen separation device downstream of the main reforming reactor, which is suitable for carrying out the start-up method according to the invention.

BACKGROUND

Hydrocarbons can catalytically be converted with steam to obtain synthesis gas, i.e. mixtures of hydrogen ($H_2$) and carbon monoxide (CO). As is explained in Ullmann's Encyclopedia of Industrial Chemistry, Sixth Edition, 1998 Electronic Release and 6th edition 2003, keyword "Gas Production", this so-called steam reformation (steam reforming) is the most frequently used method for the production of synthesis gas, which subsequently can be converted to further important basic chemicals such as methanol or ammonia. Although it is possible to convert different hydrocarbons, such as for example naphtha, liquefied gas or refinery gases, the steam reformation of methane-containing natural gas (Steam Methane Reforming, SMR) is dominant. The same proceeds strongly endothermally. It is therefore carried out in a reformer furnace in which numerous catalyst-containing reformer tubes are arranged in parallel, in which the steam reforming reaction takes place. The outer walls of the reformer furnace as well as its ceiling and its bottom are lined or covered with several layers of refractory material which withstands temperatures up to 1200° C. The reformer tubes mostly are fired by means of burners, which are mounted on the upper side or bottom side or at the side walls of the reformer furnace and directly fire the space between the reformer tubes. The heat transfer to the reformer tubes is effected by thermal radiation and convective heat transfer from the hot flue gases.

After preheating by heat exchangers or fired heaters to about 500° C., the hydrocarbon-steam mixture enters into the reformer tubes after final heating to about 500 to 800° C. and is converted there at the reforming catalyst to obtain carbon monoxide and hydrogen. Nickel-based reforming catalysts are widely used. While higher hydrocarbons are completely converted to carbon monoxide and hydrogen, a partial conversion usually is effected in the case of methane. The composition of the product gas is determined by the reaction equilibrium; beside carbon monoxide and hydrogen, the product gas therefore also contains carbon dioxide, non-converted methane and steam.

Another frequently used reforming method is the so-called autothermal reformation (ATR), which represents a combination of steam reformation and partial oxidation, in order to optimize the efficiency. In principle, any hydrocarbon or any hydrocarbon mixture can be used as feed-stock. In the ATR, the steam reformation and the partial oxidation are combined with each other such that the advantage of the oxidation (provision of thermal energy) optimally complements the advantage of the steam reformation (higher hydrogen yield). This is accomplished by an exact dosage of the air and steam supply. The catalysts used here must satisfy particularly high requirements, as they must promote both the steam reformation with the water-gas shift reaction and the partial oxidation. The partial oxidation is effected by controlled combustion of a part of the feedstocks in a burner arranged at the entrance into the autothermal reformer, whereby the thermal energy required for the succeeding steam reformation also is provided.

Both reforming methods, i.e. the steam reformation and the autothermal reformation, can also be used in combination (Combined Reforming).

For energy optimization and/or for feedstocks with higher hydrocarbons, a so-called pre-reformer can be provided upstream of the above-described reforming methods for pre-cracking the feed-stock. Pre-reformation (pre-reforming) mostly is understood to be the application of a low-temperature reforming step, which is arranged upstream of a conventional main reformer, for example a steam reformer, which is operated with natural gas. In contrast to the steam reforming reaction, the reaction equilibrium is set at far lower temperatures during the pre-reformation. The main feature of the pre-reformation is the irreversible, complete conversion of the higher hydrocarbons in the feed mixture to obtain methane and in part synthesis gas constituents. Due to the considerably lower temperature as compared to steam reforming, the main product of the pre-reformation is methane beside non-converted steam. The remaining gas components are hydrogen, carbon dioxide, traces of carbon monoxide and inert components which have already been present in the feedstock. Since virtually all higher hydrocarbons which are present in the natural gas used as feed are converted to methane and synthesis gas constituents, the risk of the formation of coke deposits in the main reformer, which with respect to the operation of the main reformer represents a particularly critical point, is reduced considerably. This permits the decrease of the steam/carbon ratio (S/C) and the increase of the heat load of the reformer tubes, which leads to a generally lower energy consumption and to a reduction in size of the used apparatuses. In addition, an amount of hydrogen already is produced in the pre-reformer by conversion of natural gas, and traces of catalyst poisons left in the feed mixture are adsorbed or absorbed on the pre-reforming catalyst. This leads to the fact that the reforming catalyst present in the main reformer operates under optimum conditions in particular at its inlet.

Upstream of the pre-reforming stage, a desulfurization stage mostly is provided, in order to remove sulfur components of the feedstock, which act as catalyst poison for the catalysts contained in the downstream reformers. The desulfurization can be effected purely by adsorption, for example on adsorbents on the basis of zinc oxide. For some applications, the hydrogenating desulfurization is preferred, in which the sulfur bound in organic and inorganic sulfur components is released in the presence of suitable catalysts by means of hydrogen in the form of hydrogen sulfide and subsequently is bound to adsorbents as described above. Therefore, said desulfurization methods often are used in combination.

Since the pre-reformation is a steam reforming process at low temperatures, special catalysts are required, in order to provide for sufficiently high reaction rates. In general, this is achieved by means of commercially available catalysts which have a high nickel content. Since such catalysts in the activated state are pyrophoric, i.e self-igniting, in air, they are supplied in an oxidized, passivated state and are incorporated into the pre-reformer in this state. During the start-up of the pre-reforming stage by the methods described in the prior art, the pre-reforming catalyst therefore must be transferred into the reduced, activated state by charging the same with a suitable reducing agent, mostly hydrogen, before the feedstocks are supplied to the pre-reforming stage. The unexamined German application DE 1545440 A describes the production of a sulfur-resistant reforming catalyst and its activation with hydrogen. It is disadvantageous here that the hydrogen required for this purpose must be supplied to the pre-reforming stage from an independent hydrogen source, since hydrogen inherent to the process is not available yet during start-up. Suitable possibilities include the delivery of hydrogen by means of a pipeline or the stockage of hydrogen in pressure tanks In both cases it is expedient to recirculate non-converted hydrogen to the pre-reforming catalyst by means of a cycle compressor. Alternatively, hydrogen for the start-up can be produced by means of a separate reforming plant, for example in miniature construction. In all these cases, however, it is unsatisfactory that the external hydrogen required for the start-up either must be supplied, stored or produced at high cost, wherein the technical apparatuses required for this purpose only are required for the start-up of the pre-reforming stage with new catalyst packing, which under typical operating conditions is effected at an interval of several years. The transport and storage of the hydrogen in the compressed state in addition involves a considerable hazard potential.

Furthermore, the use of methanol in connection with the start-up of reforming plans has been described already in the prior art. The European patent application EP 0936182 A2 for example describes a method for starting up an autothermal reformer, in which a methanol/water mixture is preheated and then charged to a methanation reactor in which the methanol is split into hydrogen, carbon oxides and small amounts of methane. The cracking gas obtained subsequently is charged to an autothermal reformer, where it serves for heating and at the same time for activating the catalyst contained in the autothermal reformer. It is disadvantageous that the document EP 0936182 A2 does not disclose an executable technical teaching for the start-up of a pre-reforming stage, in particular a pre-reforming stage in an integrated reforming method.

SUMMARY OF THE INVENTION

An object of the present invention therefore can include indicating a method for starting up a pre-reforming stage, in particular a pre-reforming stage in an integrated reforming plant, which can do without expensive and rarely used apparatuses and only with operating materials to be stored easily and with little risk.

With the embodiment of the invention as claimed in the independent claim, the aforementioned object substantially is solved with a method for starting up a pre-reforming stage in an integrated reforming plant, which comprises the pre-reforming stage and at least one main reforming stage downstream of the pre-reforming stage, wherein the pre-reforming stage is filled with a bed of granular, nickel-containing catalyst active for the pre-reformation, which before the start-up is in an oxidized or passivated state, comprising the following method steps:

(a) supplying a first gas stream (activation stream), containing methanol and water, to the pre-reforming stage and converting the activation stream in the pre-reforming stage with the catalyst contained there under activation conditions, (b) discharging a second gas stream containing hydrogen, water and carbon oxides from the pre-reforming stage and supplying the second gas stream to the main reforming stage, (c) discharging a third gas stream containing hydrogen, water and carbon oxides from the main reforming stage, wherein the third gas stream is at least partly recirculated to the pre-reforming stage.

In a further, particularly preferred aspect the start-up method according to the invention additionally comprises the following method steps:

(d) supplying at least a part of the third gas stream to the hydrogen separation stage, (e) discharging a fourth gas stream rich in hydrogen from the hydrogen separation stage and supplying the fourth gas stream to the desulfurization stage, (f) contacting the fourth gas stream rich in hydrogen with a feed stream containing hydrocarbons and sulfur components, which is supplied to the desulfurization stage, converting the gas stream rich in hydrogen with the feed stream containing sulfur components under desulfurization conditions, and discharging a desulfurized hydrocarbonaceous feed stream, (g) supplying the desulfurized hydrocarbonaceous feed stream to the pre-reforming stage, as soon as the catalyst contained in the pre-reforming stage is in a reduced or activated state.

Activation conditions are understood to be reaction conditions which are suited to transfer the nickel-containing catalyst active for the pre-reformation from the oxidized or passivated state into the reduced or activated stated by charging the same with gas streams containing methanol and steam. These reaction conditions are known in principle to the skilled person from the prior art, for example from the patent specification GB 1465269 A. In particular, these reaction conditions must be such that on the pre-reforming catalyst still present in the oxidized, passivated state at least a partial conversion of methanol with water to carbon oxides and hydrogen initially is effected, and the resulting hydrogen transfers a part of the still oxidized or passivated catalyst surface into the metallic, reduced or activated state. As on the latter the conversion of further methanol with steam is effected more quickly, the further activation will accelerate itself, until the entire surface of the pre-reforming catalyst is present in the reduced, activated state.

Desulfurization conditions are understood to be reaction conditions which are suited to effect a transfer of the sulfur-containing hydrocarbonaceous feed stream into a desulfurized hydrocarbonaceous feed stream, wherein the sulfur content must be lowered below a limit value acceptable for the reforming catalysts used. These reaction conditions also are known per se to the skilled person and are described for example in Ullmann's Encyclopedia of Industrial Chemistry, Sixth Ed., 1998 Electronic Release, keyword "Gas Production", chapter "2.2.2. Catalysts, Catalyst Poisons, Desulfurization".

Necessary adaptations of the aforementioned conditions to the respective operating requirements, for example the composition of the activation stream, of the sulfur-containing hydrocarbonaceous feed stream or the nickel content of the catalysts used, will be made by the skilled person on the basis of routine experiments.

Further advantageous aspects of the start-up method according to the invention will be found in the dependent claims.

The invention also relates to an integrated reformer plant which is suitable for carrying out the start-up method according to the invention and which each comprises at least one pre-reforming reactor, a main reforming reactor downstream of the pre-reforming reactor, a desulfurization reactor upstream of the pre-reforming reactor and a hydrogen separation device downstream of the main reforming reactor. It is characterized by a dosing device and conduits for supplying a gaseous activation stream, containing methanol and water, to the pre-reforming reactor.

Certain embodiments of the invention are based on the finding that it is possible to carry out the activation of the pre-reforming catalyst present in the oxidized or passivated state with the auxiliary substance methanol to be stored in a simple, space-saving and low-risk manner. Due to the sulfur content it is, however, not possible to carry out the activation of the pre-reforming catalyst by directly charging the pre-reforming catalyst with the hydrocarbonaceous feed stream, for example the natural gas, while bypassing the desulfurization stage. This would lead to a poisoning of the pre-reforming catalyst by sulfur components.

As explained above, a self-acceleration of the activation reaction will occur when carrying out the activation of the pre-reforming catalyst with gas mixtures containing methanol and steam. What is particularly advantageous is the absence of catalyst poisons, for example sulfur components, in the methanol. Advantageously, no substances foreign to the process are obtained by the reforming reaction of the methanol, but hydrogen and carbon oxides, which can easily be guided through the further downstream process stages. The hydrogen produced by the reformation of methanol even can be used for the start-up of the desulfurization stage after separation in the hydrogen separation stage. The start-up of the integrated reformer plant thereby is facilitated considerably.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments The FIGURE presents a flow diagram in accordance with an embodiment of the present invention.

DETAILED DESCRIPTION OF THE INVENTION

Preferably, the integrated reformer plant which includes the pre-reforming stage to be put into operation by the method according to the invention comprises a steam reforming stage (steam reformer) or an autothermal reforming stage (ATR) as main reforming stage. Both reforming technologies are technically proven and can each be used individually or in combination with each other (Combined Reforming).

An advantageous aspect of the method according to the invention provides that the feed stream containing hydrocarbons and sulfur components, which is supplied to the desulfurization stage, comprises natural gas which contains the sulfur components to be removed.

In a particularly preferred embodiment of the method according to the invention, the main reforming stage comprises an autothermal reforming stage, wherein the gas stream discharged from the pre-reforming stage after the steam reformation of the methanol in the same, which is supplied to the main reforming stage and contains hydrogen, water and carbon oxides, is utilized for igniting the burner of the autothermal reforming stage, after the activation of the catalyst contained in the pre-reforming stage is terminated. Surprisingly, it was found that the gas mixture obtained by steam reformation of methanol is very useful for igniting the burner of the autothermal reforming stage because of its low ignition delay time. In this way, further advantages of the start-up method according to the invention are obtained in an integrated reformer plant, when the same is equipped with an autothermal reformer.

It is particularly advantageous to superheat the gas stream discharged from the pre-reforming stage after steam reformation of the methanol in the same by means of a heat exchanger or burner, before it is charged to the main reforming stage. The catalyst contained in the main reforming stage thereby can be heated to its operating temperature in a particularly simple way.

Exemplary Embodiments and Numerical Examples

Further developments, advantages and possible applications of the invention can also be taken from the following description of exemplary embodiments and numerical examples as well as the drawing. All features described and/or illustrated form the the invention per se or in any combination, independent of their inclusion in the claims or their back-reference.

The only FIGURE schematically shows the method of the invention according to a particularly preferred embodiment, in which the main reforming stage comprises an autothermal reformer (ATR) and the feed stream containing hydrocarbons and sulfur components is sulfur-containing natural gas.

What is not shown in the FIGURE are auxiliary apparatuses and fittings that can be used to carry out the method, such as for example shut-off members, valves, conveying members such as pumps, compressors or blowers, condensate traps, evaporators, e.g., for methanol. Furthermore, in the following description of the exemplary embodiment preparatory steps taking place before the start-up method, such as for example the inertization of apparatuses, the filling of reactors with required catalysts, will not be discussed. The skilled person will select and use suitable auxiliary apparatuses and fittings or necessary preparatory steps on the basis of his knowledge.

In the flow diagram shown in the FIGURE, process steam is supplied via conduit 1. Previously evaporated methanol is charged to the same via conduit 2 and mixed with the steam. Alternatively, methanol and superheated steam can be added in conduit 5. Methanol also can be dosed in liquid form and for example be sprayed into the superheated gas/steam mixture.

The mixing ratio steam/methanol preferably lies in the range from 2 to 20 mol/mol, typically at 10 mol/mol. Via conduit 3, the methanol/steam mixture is supplied to the heat exchanger 4. After leaving the heat exchanger 4, the preheated methanol/steam mixture is guided via conduit 5 to the furnace 6 (superheater), in which it is heated further to the activation temperature of the pre-reforming catalyst, which typically lies between 300 and 400° C., preferably at 360° C., by means of a heat exchanger bundle located in the furnace. Via conduit 7, the heated methanol/steam mixture is supplied to the pre-reforming reactor 8, where by the steam reformation of methanol on the initially still oxidized or passivated pre-reforming catalyst hydrogen is produced, which starts the activation of the commercially available, nickel-based pre-reforming catalyst. The oxides bound on the catalyst surface are converted to steam. The waste gas of the catalyst activation, which substantially comprises steam, non-converted hydrogen, carbon oxides as well as traces of non-converted methanol and methane obtained by hydrogenation of the carbon oxides, is again supplied to the furnace 6 via conduit 9 and heated up further in the same. Via conduit 10, the activation waste gas heated up further is supplied to the burner of the autothermal reformer 11. The inlet temperature of the activation waste gas into the ATR typically is about 650° C. The activation waste gas releases its heat content to the autothermal reformer 11 and the catalyst bed contained therein and thus heats the same to the operating temperature. Due to its hydrogen content and the related low ignition delay time, the activation waste gas furthermore serves for igniting the ATR burner after reaching the ATR operating temperature, which lies in the temperature range from 650° C. to >1000° C., wherein for this purpose oxygen is supplied via conduit 22. There occurs a self-ignition of the gases entering into the ATR burner.

The activation waste gas leaving the autothermal reformer 11 is supplied to the heat exchanger 13 via conduit 12, to the heat exchanger 4 via conduit 14 and to the heat exchanger 16 via conduit 15. In normal operation of the reforming plant, the thermal energy recovered in the heat exchangers 13 and 16 is utilized for steam generation (not shown in FIG. 1). During the start-up method according to the invention, the heat exchanger 13 produces low-pressure steam by cooling from 650° C. to about 400° C. The heat exchanger 16 cools the gas stream supplied via conduit 15 to temperatures favorable for hydrogen separation, for example to about 40° C.

Via conduit 17 a part of the activation waste gas is discharged and via a return conduit 17a indicated in FIG. 1 in broken lines recirculated to the pre-reforming reactor 8 after optional heating (not shown in FIG. 1). If required, additional methanol vapor can be guided via conduit 2 to the pre-reforming reactor 8, after being heated. The hydrogen content remaining in the activation waste gas thereby is utilized again for activating the pre-reforming catalyst.

Via conduit 18, another part of the activation waste gas is supplied to the hydrogen separation stage 19. The same is designed as pressure swing adsorption plant, but the use of other suitable separation methods, for example the membrane separation, also is possible. As product of the hydrogen separation stage 19 a waste gas stream enriched in carbon oxides and methane and possibly nitrogen is obtained, which is removed from the process via conduit 20 and subsequently supplied to the further use or disposal. Furthermore, a gas stream rich in hydrogen is obtained, which via conduit 21 and conduit 28 is supplied to the hydrogenation reactor 23 which represents the first part of the desulfurization stage. Alternatively, the gas stream rich in hydrogen also can be added via conduit 21 upstream of the furnace 6 and be mixed with cold natural gas, wherein superheating of the gas mixture then is effected in the furnace 6. Product hydrogen possibly can be removed already via conduit 21a.

In normal operation of the reformer plant, the sulfur-containing organic and inorganic components contained in the natural gas are converted to hydrogen sulfide in the hydrogenation reactor 23 and subsequently separated in the adsorber 25, which represents the second part of the desulfurization stage, on a suitable adsorbent, for example zinc oxide.

The gas stream rich in hydrogen, which leaves the desulfurization stage via conduit 26, is recirculated via conduits 3, 5 and 7 to the pre-reforming reactor 8, where its hydrogen content can be utilized for the further activation of the pre-reforming catalyst.

The activation of the catalyst in the pre-reforming reactor is determined by continuous or periodic measurement of the hydrogen concentration at the reactor outlet. As soon as the catalyst contained in the pre-reforming reactor 8 has been activated completely, the supply of natural gas has been started and in the desulfurization stage hydrogen is available for the desulfurization of natural gas, oxygen can be supplied via conduit 22 and the burner of the autothermal reactor 11 can be ignited. Via conduits 27 and 28, sulfur-containing natural gas now is supplied to the desulfurization stage and the succeeding method steps of the reforming method. Directly after ignition of the ATR, the methanol addition can be reduced and shut off. The heat exchangers 13 and 16 serving the steam generation are put into operation. The normal operation of the reforming method thus is reached.

INDUSTRIAL APPLICABILITY

With the invention a method is proposed for the start-up of a pre-reforming stage, in particular a pre-reforming stage in an integrated reforming plant, which can do without expensive and only rarely used apparatuses for producing and conveying the hydrogen required for the activation of the pre-reforming catalyst. The methanol used as auxiliary substance is available on the market at low cost and can be stored with low risk. In its conversion during the activation of the pre-reforming catalyst, no reaction products foreign to the process are obtained, but only substances whose processing anyway is provided by the reforming method.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising").

"Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS

[1] conduit
[2] conduit
[3] conduit
[4] heat exchanger
[5] conduit
[6] furnace (superheater)
[7] conduit
[8] pre-reforming reactor (pre-reformer)
[9] conduit
[10] conduit
[11] autothermal reformer (ATR)
[12] conduit
[13] heat exchanger
[14] conduit
[15] conduit
[16] heat exchanger
[17] conduit
[17a] conduit
[18] conduit
[19] hydrogen separation stage
[20] conduit
[21] conduit
[21a] conduit
[22] conduit
[23] hydrogenation reactor (desulfurization stage)
[24] conduit
[25] adsorber (desulfurization stage)
[26] conduit
[27] conduit
[28] conduit

The invention claimed is:

1. A method for starting up a pre-reforming stage in an integrated reformer plant, comprising the pre-reforming stage and at least one main reforming stage downstream of the pre-reforming stage, wherein the pre-reforming stage is filled with a bed of granular, nickel-containing catalyst active for the pre-reformation, which before the start-up is in an oxidized or passivated state, the method comprising the steps of:
(a) supplying a first gas stream, containing methanol and water, to the pre-reforming stage under activation conditions thereby producing hydrogen in-situ, wherein the in-situ produced hydrogen results in the activation of the catalyst within the pre-reforming stage;
(b) discharging a second gas stream containing hydrogen, water and carbon oxides from the pre-reforming stage and supplying the second gas stream to the main reforming stage under conditions effective for providing sufficient heat to raise the temperature of the main reforming stage to an operating temperature; and
(c) discharging a third gas stream containing hydrogen, water and carbon oxides from the main reforming stage, wherein the third gas stream is at least partly recirculated to the pre-reforming stage.

2. The method according to claim 1, further comprising the steps of:
(d) supplying at least a part of the third gas stream to a hydrogen separation stage arranged downstream of the main reforming stage;
(e) discharging a fourth gas stream rich in hydrogen from the hydrogen separation stage and supplying the fourth gas stream to a desulfurization stage arranged upstream of the pre-reforming stage;
(f) contacting the fourth gas stream rich in hydrogen with a feed stream containing hydrocarbons and sulfur components, which is supplied to the desulfurization stage, converting the gas stream rich in hydrogen with the feed stream containing sulfur components under desulfurization conditions, and discharging a desulfurized hydrocarbonaceous feed stream; and
(g) supplying, only after the catalyst contained in the pre-reforming stage is in a fully reduced or activated state, the desulfurized hydrocarbonaceous feed stream to the pre-reforming stage.

3. The method according to claim 2, wherein the main reforming stage comprises a steam reforming stage or an autothermal reforming stage (ATR) or both.

4. The method according to claim 1, further comprising the steps of:
determining whether the catalyst within the pre-reforming stage is activated; and
upon a determination that the catalyst within the pre-reforming stage is activated, introducing a desulfurized natural gas feed to the pre-reforming stage.

5. The method according to claim 1, wherein the main reforming stage comprises an autothermal reforming stage and that the second gas stream containing hydrogen, water and carbon oxides is utilized, after the activation of the catalyst contained in the pre-reforming stage is terminated, for igniting a burner of the autothermal reforming stage.

6. The method according to claim 1, further comprising the step of superheating the second gas stream containing hydrogen, water and carbon oxides before entry into the main reforming stage, in order to heat the catalyst contained in the main reforming stage to its operating temperature.

7. The method according to claim 1, wherein the first gas stream comprises an absence of sulfur compounds.

8. A method for starting up a pre-reforming stage in an integrated reformer plant, the integrated reformer plant comprising the pre-reforming stage and at least one main reforming stage downstream of the pre-reforming stage, wherein the pre-reforming stage is filled with a bed of granular, nickel-containing catalyst active for the pre-reformation, which before the start-up is in an oxidized or passivated state, the method for starting up the pre-reforming stage comprising the steps of:
activating the catalyst within the pre-reforming stage by introducing a first stream comprising methanol and steam into the pre-reforming stage under activation conditions thereby producing a hydrogen in-situ, wherein the in-situ produced hydrogen results in the activation of the catalyst within the pre-reforming stage;

withdrawing an activation waste gas from the pre-reforming stage, wherein the activation waste gas comprises steam, non-converted hydrogen, carbon oxides, non-converted methanol, and methane;

heating the activation waste gas in a furnace;

introducing the activation waste gas to the main reforming stage under conditions effective for providing sufficient heat to raise the temperature of the main reforming stage to an operating temperature;

withdrawing the activation waste gas from the main reforming stage; and recirculating at least a portion of the activation waste gas to the pre-reforming stage.

9. The method according to claim 8, further comprising the step of determining whether the catalyst within the pre-reforming stage is activated.

10. The method according to claim 9, further comprising the step of, upon a determination that the catalyst within the pre-reforming stage is activated, introducing a desulfurized natural gas feed to the pre-reforming stage.

11. The method according to claim 9, wherein the step of determining whether the catalyst within the pre-reforming stage is activated comprises the steps of measuring a hydrogen concentration of the activation waste gas exiting the pre-reforming stage.

12. The method according to claim 9, wherein the method further comprises an absence of introducing a natural gas stream to the pre-reforming stage prior to a determination that the catalyst within the pre-reforming stage is fully activated.

13. The method according to claim 10, further comprising the step of starting a flow of oxygen to the main reforming stage.

14. The method according to claim 13, further comprising the step of stopping the flow of the first stream to the pre-reforming stage once the main reforming stage is ignited.

15. The method according to claim 8, wherein the step of recirculating at least a portion of the activation waste gas to the pre-reforming stage comprises the step of heating the activation waste gas to an activation temperature between 300° C. and 400° C., and then introducing the activation waste gas to the pre-reforming stage.

16. The method according to claim 8, further comprising the steps of supplying at least a part of the activation waste gas to a hydrogen separation stage arranged downstream of the main reforming stage under conditions effective for producing a waste gas and a hydrogen enriched gas; withdrawing the hydrogen enriched gas and introducing said hydrogen enriched gas to a desulfurization reactor in the presence of a natural gas stream under conditions effective for desulfurizing the natural gas stream thereby producing a natural gas feed having reduced amounts of sulfur components as compared to the natural gas stream.

17. The method according to claim 8, wherein the main reforming stage comprises an autothermal reforming stage, and, upon a determination that the catalyst within the pre-reforming stage is activated, the activation waste gas is utilized for igniting a burner of the autothermal reforming stage.

18. A method for operating an integrated reformer plant, the integrated reformer plant comprising a pre-reforming stage and at least one main reforming stage arranged downstream of the pre-reforming stage, wherein the method comprises a start-up mode and a full operation mode, wherein during the start-up mode the method comprises the steps of:

providing the pre-reforming stage with a pre-reforming catalyst, wherein the pre-reforming catalyst is provided in an oxidated state;

introducing a first stream comprising methanol and steam into the pre-reforming stage under activation conditions effective for producing hydrogen in-situ, wherein the in-situ produced hydrogen results in the activation of the pre-reforming catalyst;

withdrawing an activation waste gas from the pre-reforming stage, wherein the activation waste gas comprises steam, non-converted hydrogen, carbon oxides, non-converted methanol, and methane;

heating the activation waste gas in a furnace;

introducing the activation waste gas to the main reforming stage under conditions effective for providing sufficient heat to raise the temperature of the main reforming stage to an operating temperature;

withdrawing the activation waste gas from the main reforming stage;

recirculating at least a portion of the activation waste gas to the pre-reforming stage;

determining whether the pre-reforming catalyst is activated, wherein upon a determination that the pre-reforming catalyst is at least partially oxidized, the start-up mode further comprises an absence of introducing a natural gas stream to the pre-reforming stage, wherein upon a determination that the pre-reforming catalyst is fully activated, the start-up mode further comprises the step of introducing a desulfurized natural gas feed to the pre-reforming stage;

wherein the full operation mode further comprises the steps of:

an absence of a step of introducing the first stream to the pre-reforming stage;

introducing the desulfurized natural gas feed to the pre-reforming stage under conditions effective for pre-reforming the desulfurized natural gas feed thereby producing a pre-reformed stream; and introducing the pre-reformed stream in the presence of steam to the main reforming stage under conditions effective for producing synthesis gas.

* * * * *